United States Patent
Horiuchi (10) Patent No.: US 6,470,100 B2
(45) Date of Patent: *Oct. 22, 2002

(54) IMAGE COMPOSITION PROCESSING APPARATUS AND METHOD THEREOF

(75) Inventor: Yoshio Horiuchi, Hiratsuka (JP)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,352

(22) Filed: Jan. 29, 1999

(65) Prior Publication Data

US 2002/0006234 A1 Jan. 17, 2002

(30) Foreign Application Priority Data

Apr. 23, 1998 (JP) .......................... 10-113211

(51) Int. Cl.[7] .................. G06K 9/32; G06K 9/36; G06K 9/74; G09G 5/00
(52) U.S. Cl. ............... 382/295; 382/294; 382/287; 382/284; 382/212; 345/629; 345/626
(58) Field of Search ............... 382/295, 294, 382/284, 287, 212, 213; 345/626, 629

(56) References Cited

U.S. PATENT DOCUMENTS 5,592,304 A * 1/1997 Udagawa et al. ........... 358/444
5,638,501 A * 6/1997 Gough et al. ............... 395/135
5,686,960 A * 11/1997 Sussman et al. ............ 348/218
6,038,349 A * 3/2000 Cullen ........................ 382/294
6,072,914 A * 6/2000 Mikuni ....................... 382/284

FOREIGN PATENT DOCUMENTS

JP    4-258995    9/1992
JP    7-271994    10/1995

* cited by examiner

Primary Examiner—Leo Boudreau
Assistant Examiner—Yosef Kassa
(74) Attorney, Agent, or Firm—Scully, Scott, Murphy & Presser; Daniel P. Morris, Esq.

(57) ABSTRACT

The present invention allows the positional relationship among a plurality of image layers constituting a composed image to be precisely recognized. More specifically, the present invention is directed to an image composition processing apparatus which generates a composed image which is a superposition of a plurality of image layers and displays it within a window of the screen. When the user designates one of the image layers and moves the pointer into the displayed composed image, the image composition processing apparatus converts only a predetermined area of the image layers above the designated image layer, for example, the area which is superposed in the range of a radius of m picture elements centering the coordinate of the pointer in the composed image, to a translucent state. When the image composition processing apparatus superposes the image layers a part of which is made translucent, a composed image which indicates to the user what position do the image layers above the designated image layer take with respect to those below the designated image layer in the periphery of the pointer is obtained.

11 Claims, 11 Drawing Sheets

Image Processing Apparatus 1

IMAGE COMPOSITION PROCESSING APPARATUS AND METHOD THEREOF

BACKGROUND OF THE INVENTION

1. Technical Field

The present invention relates to an image composition processing apparatus and a method thereof which allows a positional relationship among image layers to be easily recognized in adjusting relative positions among a plurality of image data items (image layers) for composition processing.

2. Prior Art

A software called photo retouch software has been used to edit a home page of the internet. The photo retouch software has a function to edit image layers and compose them into a final image.

In composing the edited image layers, it is convenient to display image layers which is made translucent in superposition to allow them to be recognized because it is necessary to precisely align the image layers.

For example, PUPA 7-74924 discloses a technology applicable to such use in which images are made translucent and superposed. Also, there is a photo retouch software in the market which has a function to make image layers translucent and display them in superposition.

However, the method of making the entire image layers translucent for display is not necessarily suitable for the use in recognizing a part of a composed image. Specifically, even when recognizing the manner of superposition of a very small portion of a composed image, the operation is complicated because the visible or invisible state of each individual image layer has to be changed.

Further, this method does not allow a work to be done to recognize the manner of superposition of a detail of the composed image while viewing the entire composed image.

A photo retouch software "Photoshop" (trade name of Adobe Systems Inc.) provides a convenience of recognizing each image layer by displaying a GUI (graphical user interface) image called "Layer Palette" in the screen.

However, it may be difficult to recognize in this method because each image layer is displayed in the GUI window in a small size. Specifically, because each image layer is independently displayed in each window in a small size, it is impossible to employ a recognition method of viewing the result of superposition, for example, by superposing image layers below a certain layer in a normal manner while making the layers above the certain layer translucent.

In addition, because adjustment of the position and recognition of the manner of superposition of the image layers have to be done by referring to separate areas on the screen in this method, the movement of eyes is large and imposes a heavy burden to a user.

Therefore, if an image for recognizing the manner of superposition of the image layers is displayed near a mouse pointer and the like used for adjusting the position of image layers, the movement of eyes will be less in editing work and the burden on the user will be reduced.

SUMMARY OF THE INVENTION

The present invention is conceived in view of the above described problems of the prior art and aims at provision of an image composition processing apparatus and a method thereof which allows the positional relationship among a plurality of image layers to be precisely recognized and, thus, allows the image layers to be superposed with a precise alignment.

The present invention further provides an image composition processing apparatus and a method thereof which displays a desired portion of a composed image in translucence to allow the positional relationship among a plurality of image layers superposed in this portion to be easily recognized.

Still further, the present invention is directed to an image composition processing apparatus and a method thereof which displays the manner of superposition of the composed image in a GUI window in an image editing work to improve the operability of the work.

The present invention is still further directed to an image composition processing apparatus and a method thereof which displays the manner of superposition of the composed image in the proximity of and in correlation to a pointer image which is displayed on the screen in an image editing work to make the work easy.

BRIEF DESCRIPTION OF THE DRAWINGS

Preferred embodiments of the present invention will now be described by way of example only, with reference to the accompanying drawings in which:

FIGS. 5(A) and (B) are diagrams showing an example of GUI images generated by the GUI image generating part 32. FIG. 5(A) shows a GUI image corresponding to the composed image shown in FIG. 3 while

DETAILED DESCRIPTION OF THE PREFERRED EMBODIMENTS OF THE INVENTION

The present invention is directed to an image composition processing apparatus comprising pointer image displaying means for displaying an image of a pointer indicating an arbitrary position in the screen of an image display device in response to an operation from the exterior, image composition/displaying means for composing a plurality of image data items (image layers) in superposition with the positional relationship among the image layers maintained and displaying the resulting composed image in said screen, positional relationship adjusting means for adjusting the positional relationship among the plurality of image layers in response to said operation to said displayed composed image, and positional relationship displaying means for displaying an image indicating the adjusted positional relationship among said plurality of image layers (positional relationship image) in said screen in correlation to said pointer image.

Preferably, said positional relationship displaying means receives designation of more than one of said image layers and composes frame images indicating frames of said designated image layers with the positional relationship of said designated image layers maintained to display the composed images as said positional relationship image in correlation with said pointer image.

Preferably, said apparatus further comprises layer information image displaying means for displaying a plurality of layer information images indicating respective information of said plurality of image layers, said positional relationship displaying means, when it receives designation of more than one of said image layers and said pointer image is in any of said layer information images of said plurality of image layers, composes said designated image layers and frame images indicating the frame of predetermined one or more of said image layers with the positional relationship maintained, and displays the composed images as said positional relationship image in correlation with said pointer image.

Preferably, said positional relationship displaying means makes an area (transparent area) of one or more of said image layers corresponding to the position of said pointer image on said composed image transparent. Said image composing/displaying means superposes and composes the image layer in which said transparent area is made transparent and an image layer other than said image layer in which said transparent area is made transparent to generate said composed image for display and displays said superposed image layers as said positional relationship image in the transparent area of said composed image.

Preferably, said image composing/displaying means composes said plurality of image layers so as to make image layers superposed on top visible and said positional relationship displaying means receives designation of one of said plurality of image layers to make the image layer superposed above said designated image layer transparent.

The image composition processing apparatus of this invention effects so-called photo-retouch processing to modify, change, aligns the position of and superpose a plurality of image data items (image layers) to generate a composed image.

In the image composition processing apparatus of this invention, it is so devised that the positional relationship among the image layers is displayed in correlation to the pointer image of a mouse pointer and the like used for aligning the position of the image layers so that the user can conveniently recognize the manner of superposition of the image layers.

In the image composition processing apparatus of this invention, when the user effects a pointing operation to point an arbitrary position in the screen by a mouse while viewing the screen, for example, the pointer image display device receives the pointing operation, detects the position in the screen pointed by the user and displays a pointer image at the position pointed by the user.

The image composition/displaying means superposes the image layers maintaining the positional relationship decided by the position adjusting process and the superposing relationship indicating which one is visible (upper) or invisible (lower) when the opaque portion of the image layers are superposed to generate a composed image.

The image composing/displaying means also superposes the image layers a part of which is made translucent so that a part of the image can be seen through with the positional relationship the superposing relationship among image layers maintained for recognizing the positional relationship to generate a composed image.

The image composing/displaying means displays the generated composed image in a predetermined position in the screen, for example, in a window of the screen for displaying the composed image.

The positional relationship adjusting means receives an operation to allow the user to select, move and align an image layer displayed, for example, in the composed image displaying window or a predetermined operation window of the screen by a mouse and the like, modifies the position of the image layer selected by this operation in the composed image, and adjusts the positional relationship among the image layers.

The positional relationship displaying means displays an image superposing an image indicating the positional relationship among the image layers the positional relationship of which is adjusted by the positional relationship adjusting means, for example, an image of a part of composed image which is made translucent (which is superposed by the image composing/displaying mean and becomes an image indicating the positional relationship of the image layers), and an outer frame of the designated image layer with the positional relationship of these image layers maintained in the periphery or proximity of a pointer image in the screen in correlation to the pointer image in the screen.

The effect of the Positional relationship displaying means is further described.

The positional relationship displaying means converts only a predetermined area of an image layer above the designated image layer, that is, the area superposed within a range of a radius of m picture elements (m is an integer) from the pointer image in the composed image, to a transparent image and supplies it to the image composing/displaying means as a positional relationship image when there is a pointer image within or in the proximity of the composed image displayed in the window of the screen.

The image layers a part of which are made translucent are superposed by the image composing/displaying means and indicate to the user what position do the image layers above the designated image layer take with respect to the composed image below the designated image layer in the area around the pointer image.

Alternatively, the positional relationship displaying means receives designation of more than one image layers and superposes frame images indicating the outer frame of the respective designated image layers with the positional relationship of these image layers maintained for display in the proximity of the pointer image in correlation thereto.

Specifically, the positional relationship displaying means displays a plurality of rectangles which are shifted so as to reflect the positional relationship among the image layers and indicate the outer frames of the respective image layers in the proximity of the pointer image at an arbitrary position within the display window of the composed image.

Alternatively, the positional relationship displaying means superposes a predetermined image layer, for example, a frame image of an image layer of the background image of the lowermost layer, and the designated image layer, for example, a frame image of an image layer displayed in the editing window where the pointer image exists, with the positional relationship among these image layers maintained for display in the proximity of the pointer image. Specifically, the positional relationship displaying means shifts rectangles indicating the outer frames of the image layers of the background image and rectangles indicating the outer frames of image layers within the editing window indicated by the pointer image so as to reflect the positional relationship among these image layers for display within the window where the pointer image exists.

The image composition processing method of this invention comprises the steps of displaying an image of a pointer indicating an arbitrary position in the screen of an image display device in response to an operation from the exterior, superposing a plurality of image data items (image layers) to compose them with the positional relationship among the image layers maintained, displaying the resulting composed image in said screen, adjusting the positional relationship among the plurality of image layers in response to said operation to said displayed composed image, and displaying an image indicating the adjusted positional relationship among said plurality of image layers (positional relationship image) in said screen in correlation with said pointer image.

The recording medium of this invention records a program for causing a computer to execute; a pointer image displaying step for displaying an image of a pointer indicating an arbitrary position in the screen of an image display device in response to an operation from the exterior, an image superposing and composing step for superposing a plurality of image data items (image layers) to compose them with the positional relationship among the image layers maintained, displaying the resulting composed image in said screen, a positional relationship adjusting step for adjusting the positional relationship among the plurality of image layers in response to said operation to said displayed composed image, and a positional relationship displaying step for displaying an image indicating the adjusted positional relationship among said plurality of image layers (positional relationship image) in said screen in correlation with said pointer image.

Figure 1:
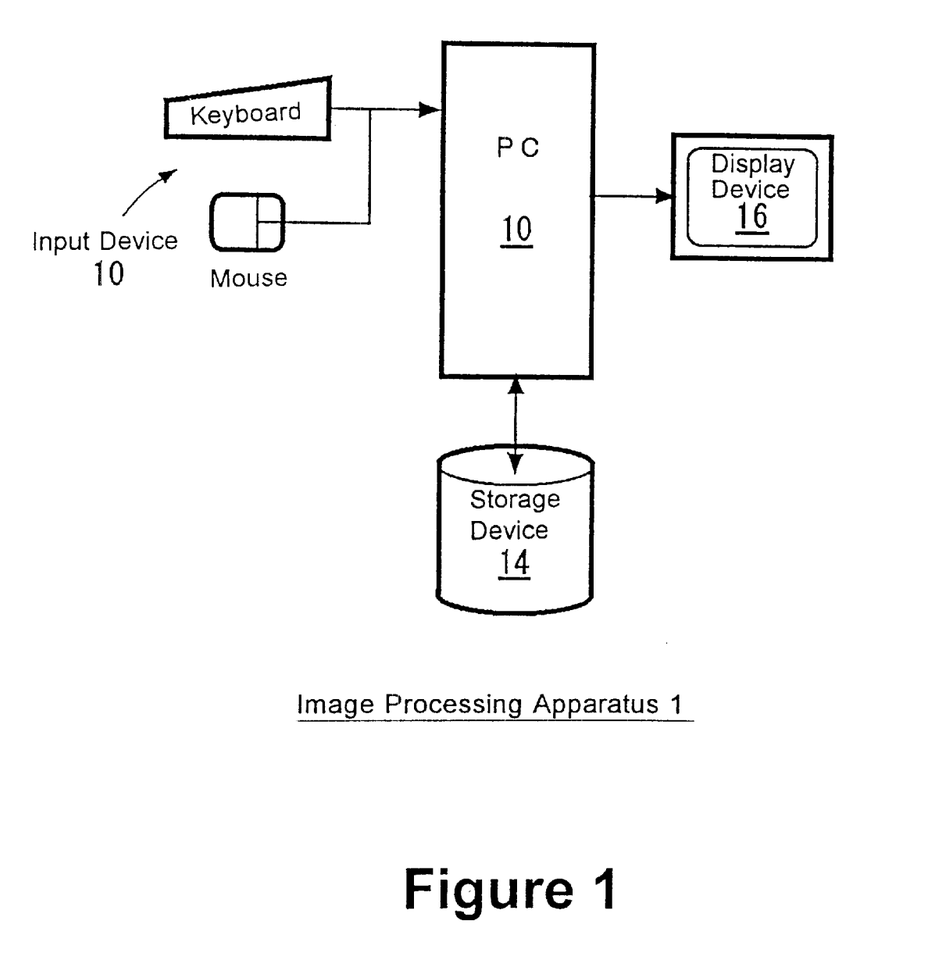
FIG. 1 is a diagram showing the configuration of the image processing apparatus 1 of the present invention.

As shown in FIG. 1, the image processing apparatus 1 comprises components of a computer which is capable of image processing, such as an input device 10 including a keyboard and a mouse (pointing device), a computer unit (PC) 12 including a CPU, a memory and peripheral circuits (not shown), a recording device 14 such as a hard disk device (HDD) and a display device 16 such as CRT display device.

Figure 2:
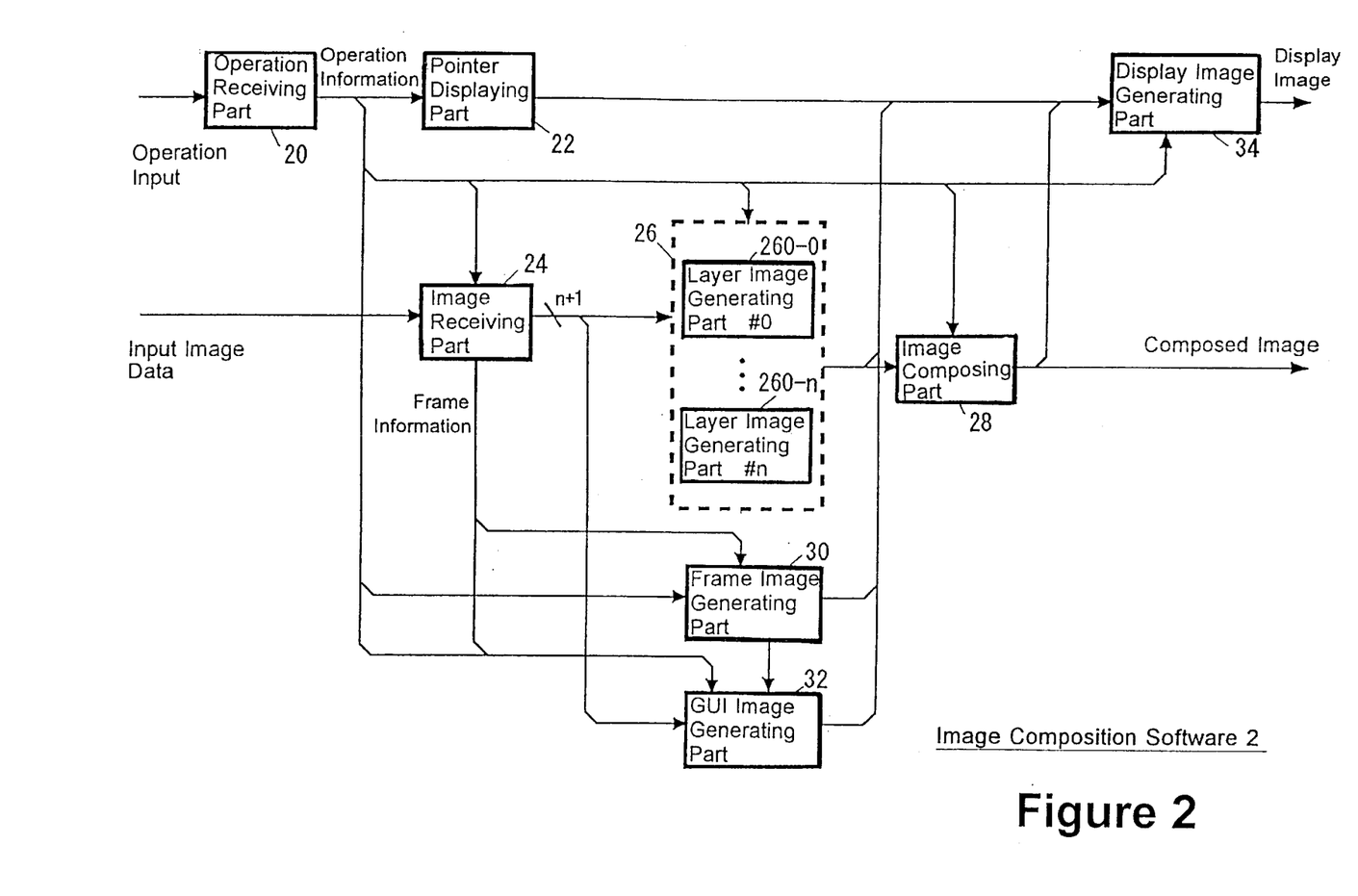
FIG. 2 is a diagram showing the configuration of the retouch software executed in the image processing apparatus 1 shown in FIG. 1.

As shown in FIG. 2, the retouch software 2 comprises an operation receiving part 20, a pointer displaying part 22, an image receiving part 24, an image generating part 26 including (n+1) layer image generating part 260-0 to 260-n (n is an integer no smaller than 1), an image composing part 28, a frame image generating part 30 and a GUI image generating part 32. The retouch software is stored, for example, in the recording device shown in FIG. 1 and loaded in the memory of the computer unit 12 for execution in response to an operation by the user.

With these components, the retouch software 2 modifies and changes a plurality of image data items (image layers), adjusts the positional relationship among the image layers, and superposes the image layers with the positional relationship among the adjusted image layers and the relationship of visibility and invisibility among the opaque portions of the image layers maintained to generate a composed image.

The retouch software 2 also displays an image (positional relationship image) showing the positional relationship among the image layers in correlation to the mouse pointer so as to allow the user to easily recognize the positional relationship, i.e., the manner of superposition of the image layers.

The operation receiving part 20 receives an input operation and a pointing operation which the user effected to the keyboard of the input device 10 and the mouse while viewing the image displayed in the display device 16.

The operation receiving part 20 also generates operational information, that is information indicating the coordinate of the mouse pointer on the screen of the display device 16, the position in the screen of the display device 16 to which the user pointed by the mouse, a display mode which the user specified to the retouch software 2 and an operation to the GUI image based on the received operation, and outputs the information to the components of the retouch software 2.

The pointer display part 22 generates a pointer image which displays an image of the mouse cursor of a shape of, for example, an arrow head at a position in the screen of the display device 16 which the user pointed and outputs it to the display image generating part 34.

Figure 3:
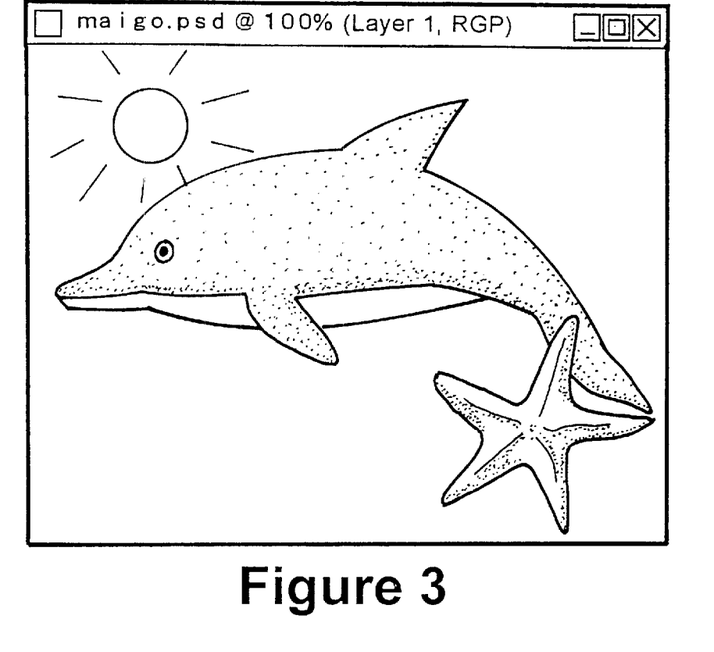
FIG. 3 is a diagram showing a composed image generated by the retouch software 2 shown in FIG. 2 and image layers constituting this composed image.

The image receiving part 24 receives a plurality of image data items read out from the display device 16 (image layer; an image layer comprising the composed image shown in FIG. 3 including, for example, an opaque image of a dolphin, an opaque image of the shape of a starfish and an opaque image of the shape of a vortex) or a plurality (2 to n+1) of image layers from a digital camera connected to the image processing apparatus 1 and outputs it to the layer image generating parts 260-1 to 260-n of the image generating part 26.

The image receiving part 24 also generates frame information indicating the size and the shape (outer frame) of the received image layer and outputs it to the frame image generating part 30 and the GUI image generating part 32.

In the image generating part 26 (FIG. 2), for example, the layer image generating parts 260-0 to 260-n generate respective image layers 0 to n.

Each of the layer image generating part 260 (the layer image generating parts 260-0 to 260-n are collectively referred to simply as a layer image generating part 260 unless they are specifically referred to) stores an image layer inputted from the image receiving part 24, modifies the positional relationship among the image layers based on the operational information inputted from the operation receiving part 20 (for example, information indicating an operation by the user to select and move the outer frame of an image layer displayed by a dotted line in the composed image), and cuts out an area to be superposed as a composed image for output to the image composing part 28.

Figure 4:
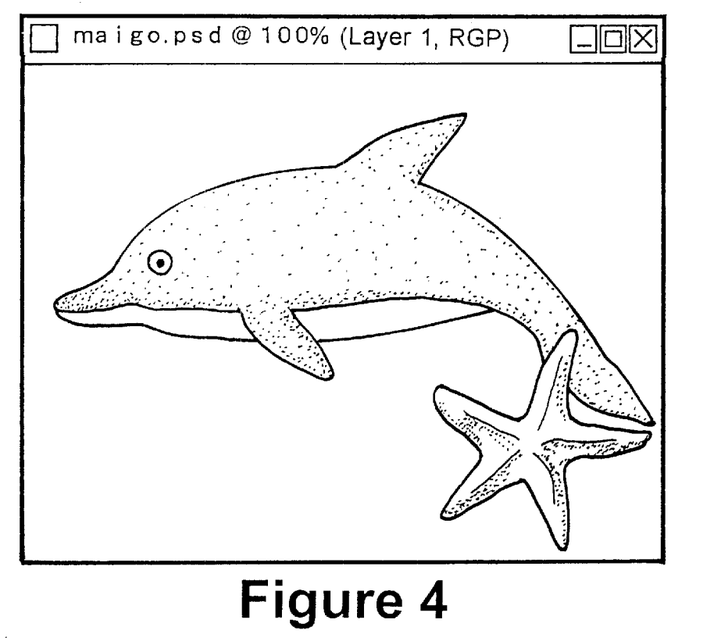
FIG. 4 is a diagram showing a composed image obtained when the positional relationship of the image layers shown in FIG. 3 is modified.

When the user effects an operation to shift only the image layer including the image of the shape of a vortex as shown in FIG. 4 among the 3 image layers comprising the composed image shown in FIG. 3, for example, the image generating part 26 does not modify the areas to be cut out from the image layers including the image of the dolphin and the starfish and modifies only the area to be cut out from the image layer including the image of the vortex.

When the user specifies a transparent mode, the image generating part 26 converts a predetermined area of the image layers above the image layer designated by the user to transparent (or translucent) image data based on the operational information from the operation receiving part 20 and outputs it to the image composing part 28 and the display image generating part 34.

The area of the image layer which is made transparent by the image generating part 26 is a composed image within a circular area of a radius of m picture elements (m is an integer) from the coordinate of the pointer image displayed in the display device 16, or an area comprising a composed image within a rectangular area having the center at the coordinate of the pointer. The image generating part 26 makes the opaque portion of the image layer above the designated image layer transparent without modifying other portion so as not to affect the users visibility of the designated image layer.

Incidentally, the image generating part 26 may adjust the degree of transparency of the image layer depending on users preference. For example, when the image layer of interest is scarcely visible through the image layers above that layer, the image layers above that layer may be made almost transparent so that the image layer of interest is clearly visible depending on users preference.

The image composing part 28 (FIG. 2) generates a composed image by superposing image layers inputted from the image generating part 26 and outputs it to the display deice 16 or the recording device 14 (FIG. 1) and the display image generating part 34.

The frame image generating part 30 generates a frame image for displaying the outer frames of the respective image layers designated by the user by a mouse operation to the GUI image in the proximity of the pointer image with the positional relationship among the image layers which were modified by the user reflected therein, based on frame information inputted from the image receiving part 24 and operational information inputted from the operation receiving part 20, and outputs them to the display image generating part 34.

Incidentally, the frame image outputted from the frame image generating part 30 is an image of a superposition of the rectangles of respective image layers with the layers shifted corresponding to the positional relationship among the image layers.

The GUI1 image generating part 32 outputs a reduced image layer and a GUI image indicating an operation such as modification and change of an image layer and used for receiving an operation in response to the pointing by the user to the display image generating part 34.

Figure 5A:
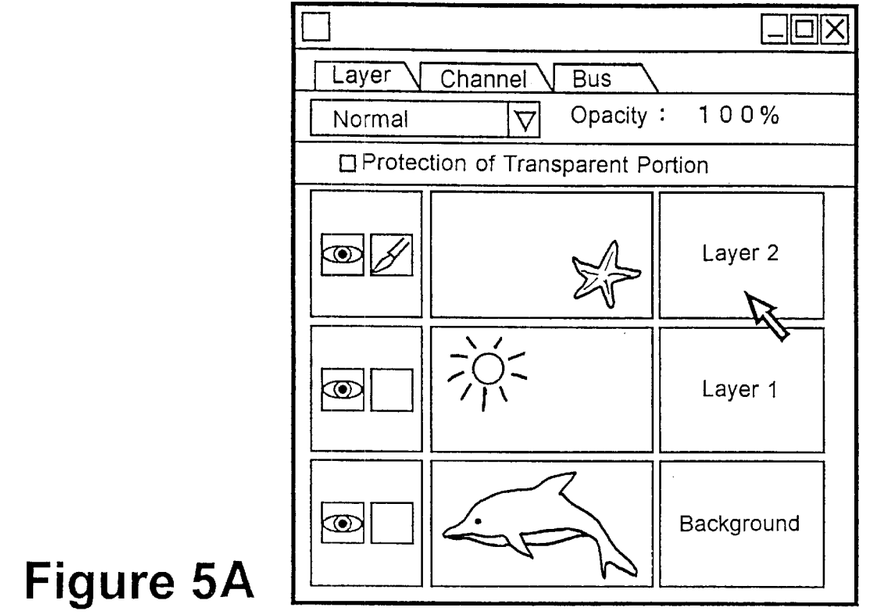
Figure 5B:
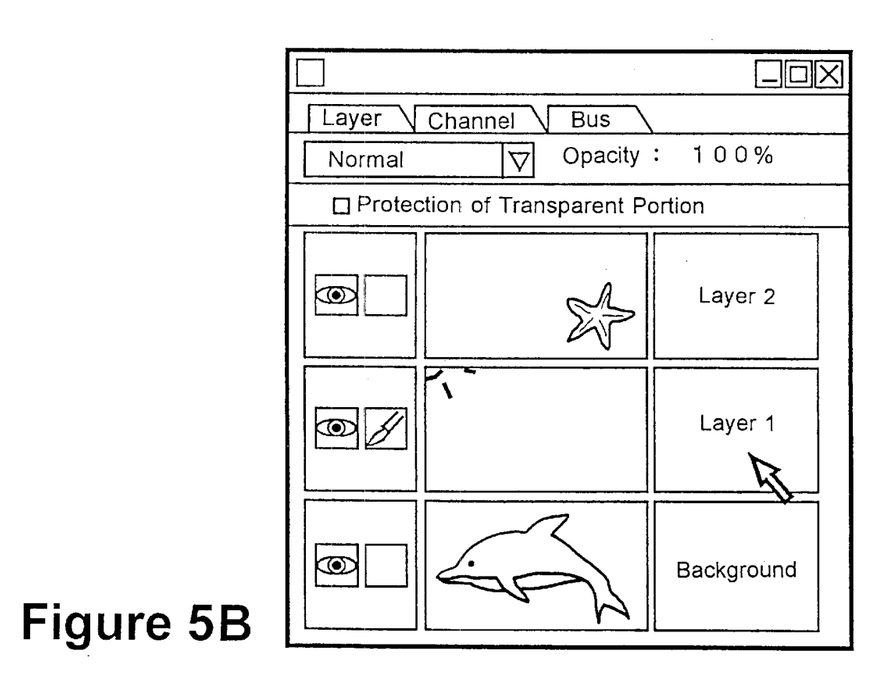
FIG. 5(B) shows a GUI image corresponding to the composed image shown in FIG. 4.

Specifically, the GUI image generating part 32 displays a window for each image layer as shown in FIGS. 5(A) and (B), displays the area of each image layer to be cut out as an area constituting a composed image in a reduced size, and further displays an image indicating a process effected to each image layer in the periphery of the window.

Accordingly, the GUI image generating part 32 generates a GUI image shown in FIG. 5(A) when the user adjusts the positional relationship of the image layers as shown in FIG. 3 while it generates a GUI image shown in FIG. 5(B) when the user adjusts as shown in FIG. 4.

The operation effected by the user to the GUI image which is generated by the GUI image generating part 32 and displayed in the display device 16 is received by the operation receiving part 20. When the user selects the frame image mode and points one of the windows in the GUI image shown in FIGS. 5(A) and (B), the GUI image generating part 32 generates a frame image which displays the frame of the image layer (background) including the image of the dolphin of the lowermost layer, the outer frame of the image layer (layer 1, 2) displayed in the pointed window, and the reduced version of that layer (layer 1, 2) in the window with the positional relationship among the image layers maintained, and outputs it to the display image generating part 34.

The display image generating part 34 generates, in response to operation information inputted from the operation receiving part 20, a display image which displays a pointer image inputted from the pointer display part 22, an image layer inputted from the image generating part 26, a composed image inputted from the image composing part 28, a frame image inputted from the frame image generating part 30, and a GUI image inputted from the GUI image generating part 32 in a suitable disposition in the screen for display on the display device 16.

The operation of the image processing apparatus 1 is now described hereunder.

Figure 6:
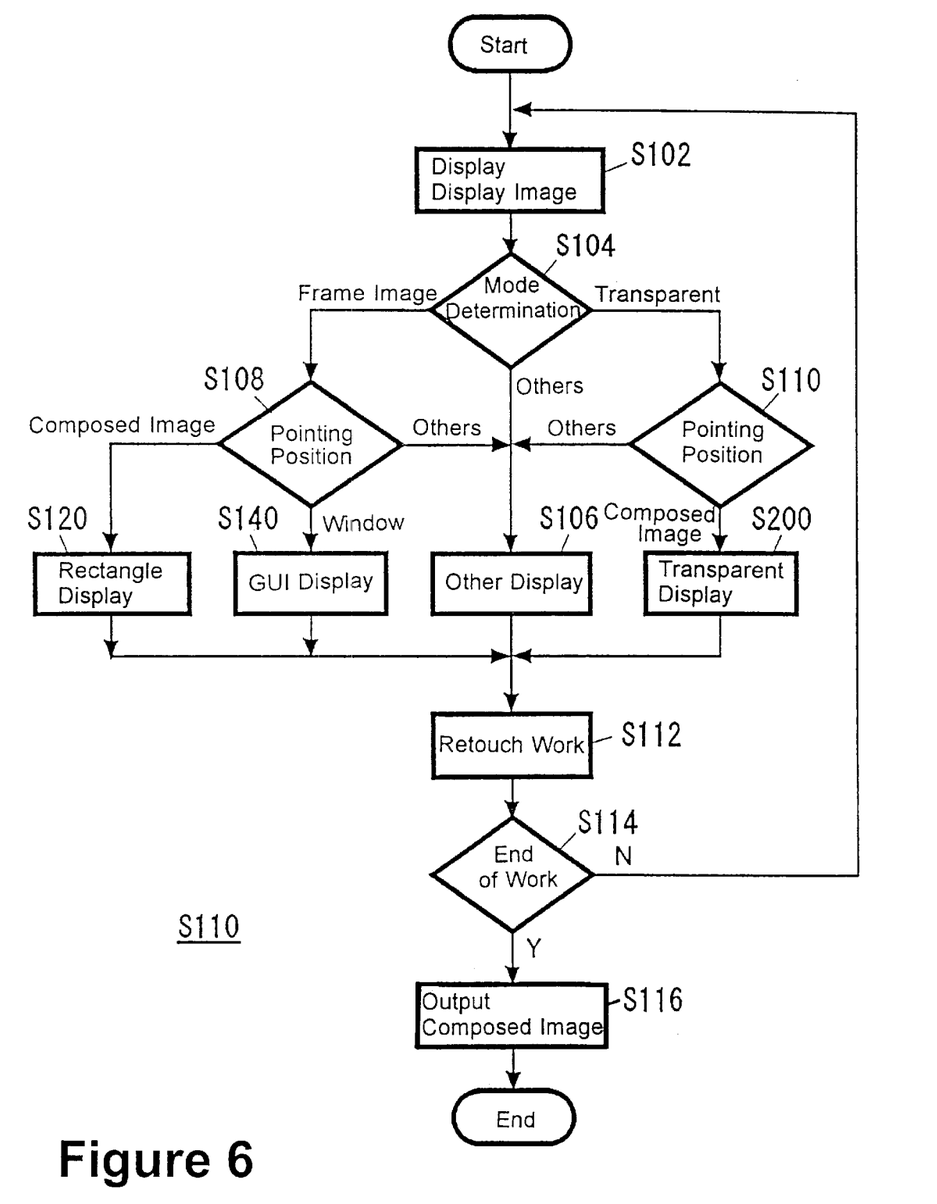
FIG. 6 is a flow chart showing the operation (S100) of the image processing apparatus 1 shown in FIG. 1.

As shown in FIG. 6, in step 102 (S102), the display image generating part 34 of the retouch software 2 displays an inputted pointed image, an inputted composed image, an inputted frame image and an inputted GUI image, or a combination thereof in the display device 16.

In step 104 (S104), the image generating part 26, the frame image generating part 30 and the GUI image generating part 32 determine the display mode which the user specified by an operation.

When the user specified a frame image mode, the frame image generating part 30 and the GUI image generating part 32 proceed to the process of S108 while the image generating part 26 proceed to the process of S110 when the user specified the transparent mode. Otherwise, the image generating part 26 and the like proceed to the process of S106.

In step 106 (S106), the image generating part 26 and the like display other display such as a composed image and a GUI image [FIG. 3 to FIG. 5(A), (B)] in a normal manner, for example, without displaying the manner of superposition of the image layers.

In step 108 (S108), the frame image generating part 30 and the GUI image generating part 32 determine whether the pointer image is in the composed image displayed in the display device 16 or is in the window of the GUI image (pointing position) and proceed to the process of S120 (FIG. 7) when the pointer image is in the composed image or proceed to the process of S140 (FIG. 9) when it is in the window. The frame image generating part 30 and the GUI image generating part 32 proceed to the process of S106 otherwise.

Figure 7:
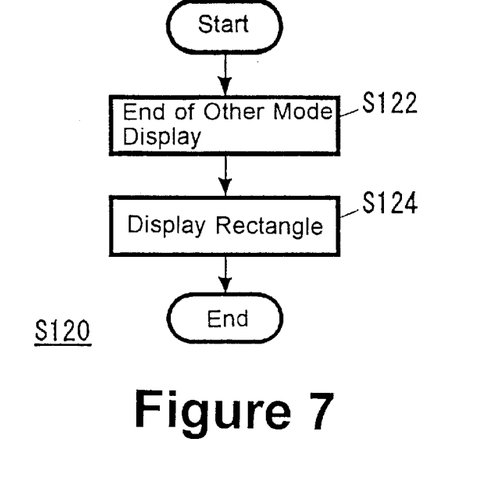
FIG. 7 is a flow chart showing a rectangle displaying process (S120) shown in FIG. 6.

As shown in FIG. 7, in step 122 (S122), the image generating part 26 and the GUI image generating part 32 end display in other display mode (for example, the layer image generating parts 260 each restores the transparent image layer to the original image).

Figure 8:
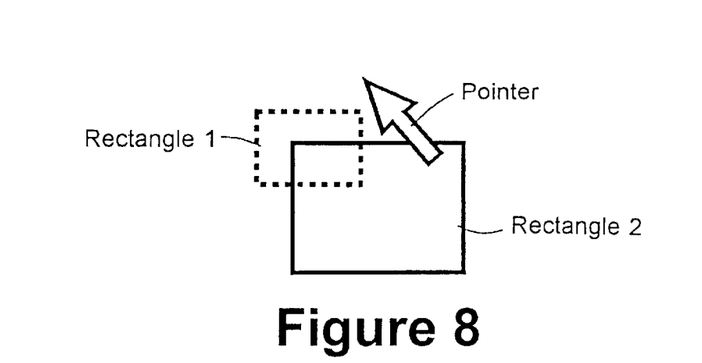
FIG. 8 is a diagram showing an example of a rectangular image which the frame image generating part 30 (FIG. 2) displays in the display device 16.

In step 124 (S124), the frame image generating part 30 displays rectangles 1 and 2 indicating image layers 1 and 2 selected by the user in the proximity of the pointer image in correlation thereto with the positional relationship among these image layers reflected as shown in FIG. 8, for example.

Figure 9:
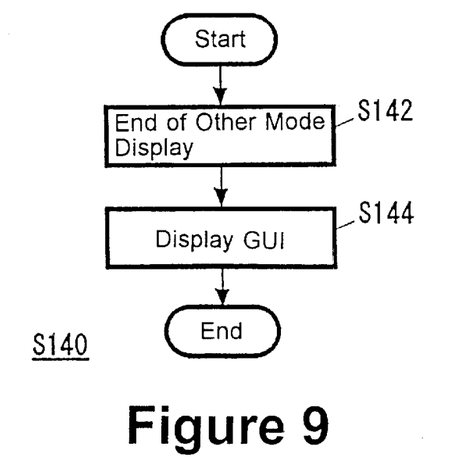
FIG. 9 is a flow chart showing the GUI display process (S140) shown in FIG. 6.

As shown in FIG. 9, in step 142 (S142), the image generating part 26 and the frame image generating part 30 end display in other display mode (for example, the layer image generating parts 260 each restores the transparent image layer to the original image).

Figure 10:
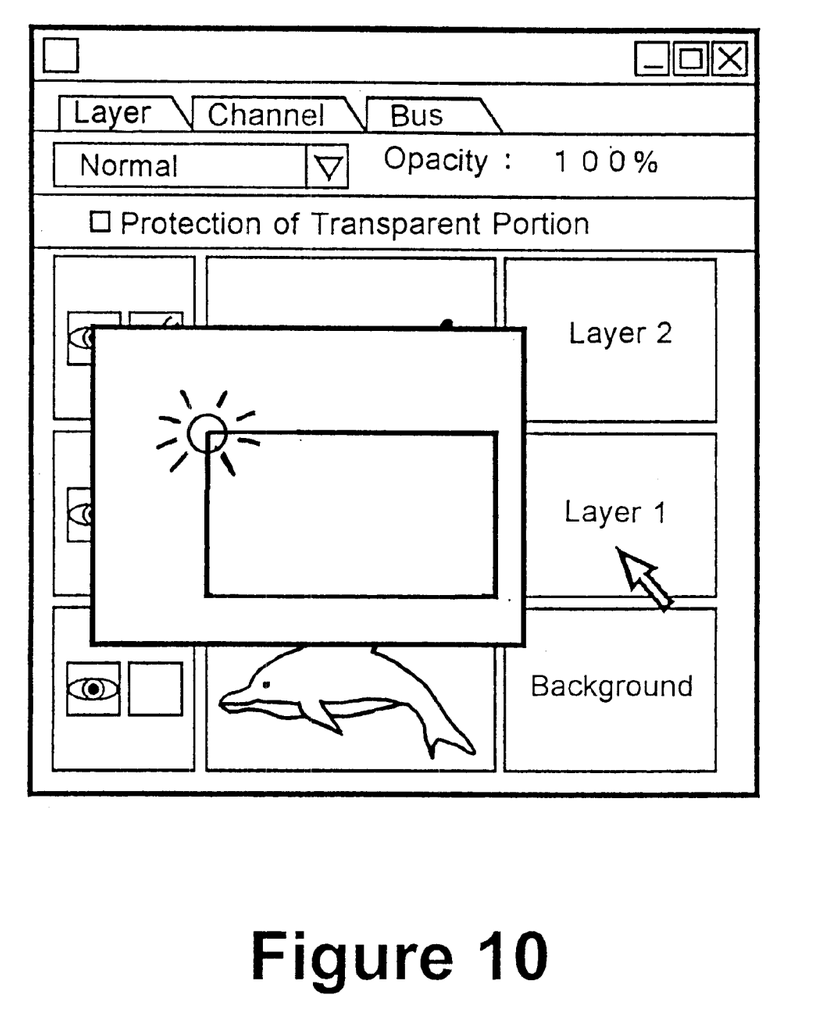
FIG. 10 is a diagram showing an example of a GUI image which the GUI image generating part 32 displays in the display device 16.

In step 144 (S144), the GUI image generating part 32 superposes a rectangle indicating a predetermined image layer (for example, the lowermost image layer of the background), a rectangle indicating an image layer selected by the user and shown in the window within the GUI image in which the pointer image is placed, and a reduced image indicating the content of that image layer, and displays them in the window in correlation to the pointer image as shown in FIG. 10, for example.

FIG. 6 is referred to again.

In step 110 (S100), the image generating part 26 determine whether the pointer image is in the composed image (pointing position) and proceed to the process of S200 (FIG. 11) when the pointer image is in the composed image while it proceeds to the process of S106 otherwise.

Figure 11:
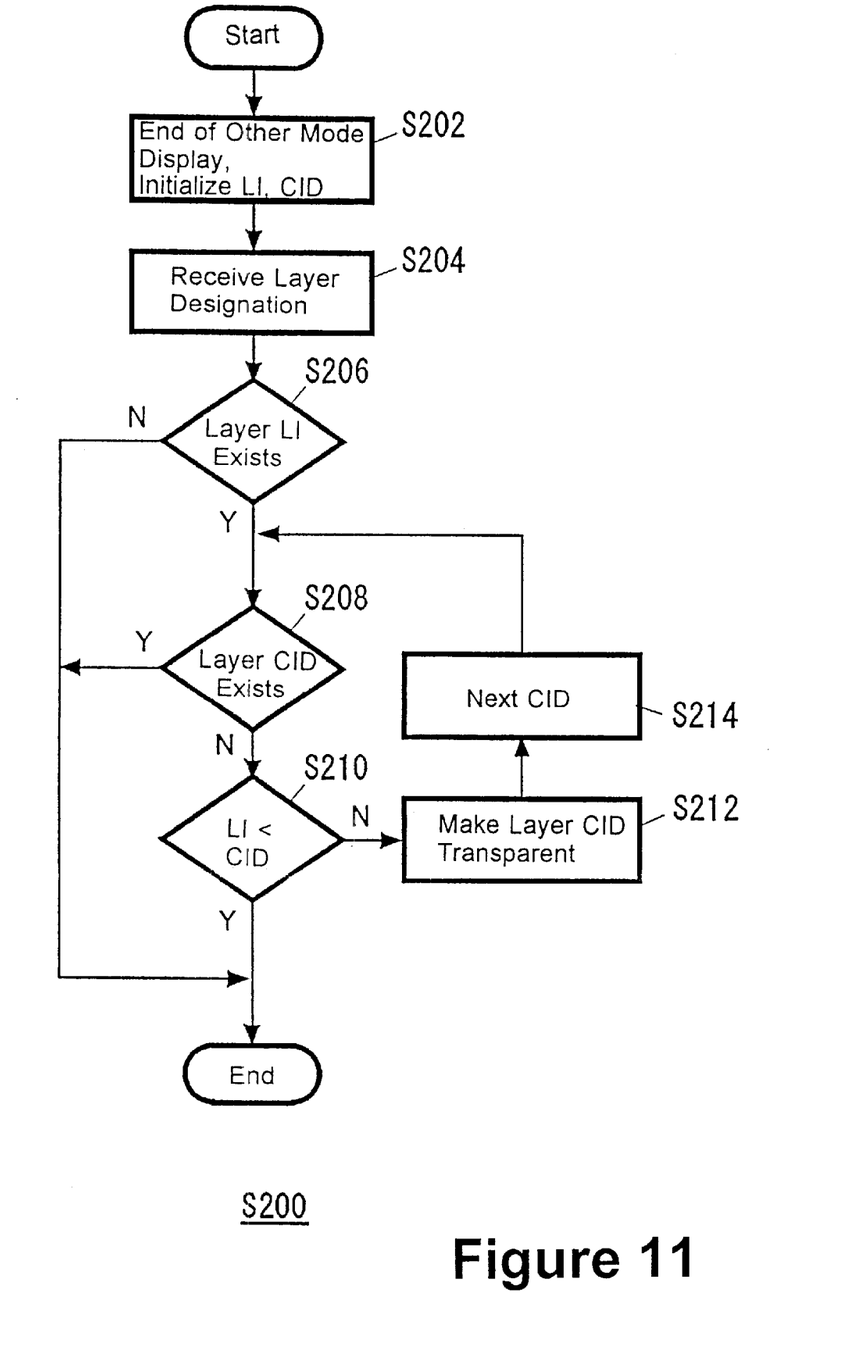
FIG. 11 is a flow chart showing a transparent display process (S200) shown in FIG. 6.

As shown in FIG. 11, in step 202 (S202), the frame image generating part 30 and the GUI image generating part 32 end display in other mode (erase the rectangular image shown in FIG. 8 and FIG. 10) while the image generating part 26 effects an initializing process (clearing variables LI, CID to zero, for example) to effect a transparent display process.

In step 204 (S204), the image generating part 26 receives users designation of an image layer i', substitutes the variable LI with i' subtracted by 1 (LI=i−1) and substitutes the variable CID with the number of image layers constituting the composed image (n when the image layer composed on top is an image layer n).

In step 206 (S206), the image generating part 26 determines whether or not an image layer LI exists. The image generating part 26 ends processing when there is no image layer LI (LI>n, for example) while it proceeds, to the process of S208 otherwise.

In step 208 (S208), the image generating part 26 determines whether or not an image layer CID exists. The image generating part 26 proceeds to the process of S210 when there is the image layer CID while it ends processing otherwise.

In step 210 (S210), the image generating part 26 determines whether or not the variable LI is less than the variable CID and end processing if the variable LI is less than the variable CID while it proceeds to the process S212 otherwise.

In step 212 (S212), the layer image generating part 260-CID of the image generating part 26 effects a process of making a predetermined area corresponding to the pointer image in the composed image displayed in the display device 16 among the images of the image layer CID, e.g., the area of the image layer CID constituting the composed image within the range of m picture elements from the coordinate of the pointer image translucent.

In step 214 (S214), the image generating part 26 subtracts a value 1 from the variable CID (decrement) and returns to the process of S108.

In summary, by the process shown in FIG. 11, the portion corresponding to the periphery of the pointer image of the image layers above the image layer i which is designated by the user is converted so as to become translucent. Each image layer is composed in the image composing part 28 and the image layer is displayed through transparent layers.

Incidentally, the process of the image generating part 26 shown in FIG. 11 may be so modified as to omit to designate an image layer by the user, such as making the image layers transparent only except for a predetermined image layer such as the image layer of the background.

The translucent display jointly effected by the image generating part 26 and the image composing part 28 is further described with reference to FIG. 12 to FIG. 16 which show an image of simpler pictures than FIG. 3 and the like for the convenience of description.

Figure 12:
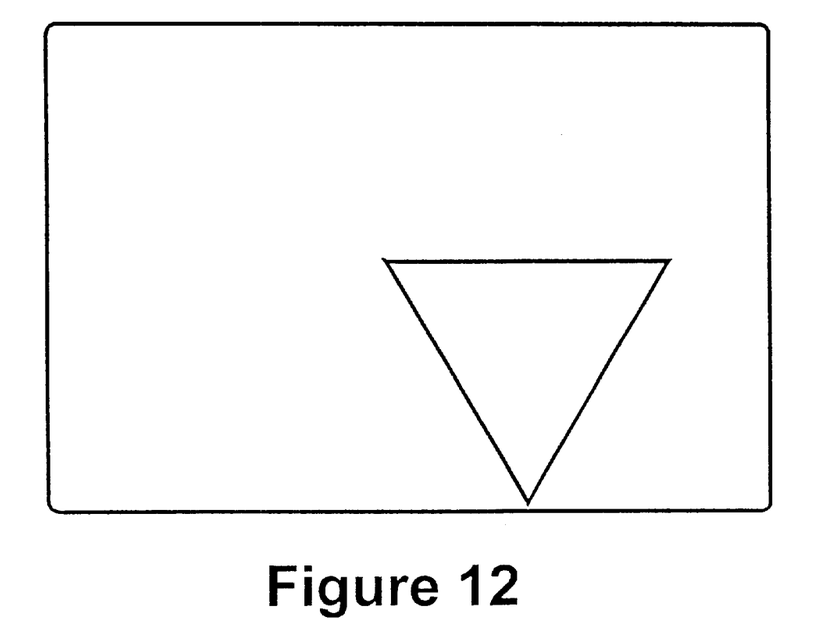
FIG. 12 is a diagram showing an image layer 2 composed in the upper most layer in the composed image using a simple picture as an example.
Figure 13:
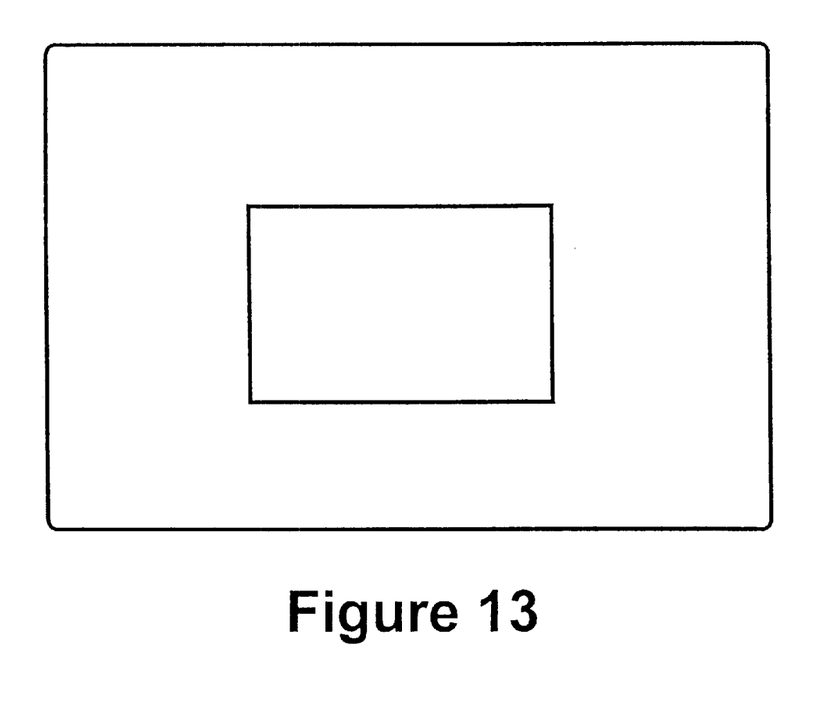
FIG. 13 is a diagram showing an image layer 1 composed below the image layer 2 (FIG. 12) in the composed image using a simple picture as an example.
Figure 14:
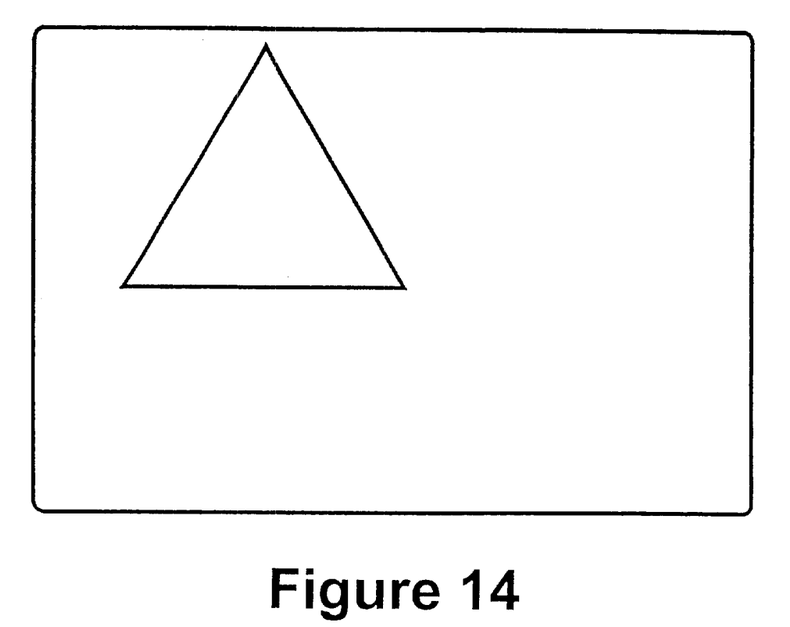
FIG. 14 is a diagram showing an image layer 0 composed below the image layer 1 (FIG. 13) in the composed image using a simple picture as an example.
Figure 15:
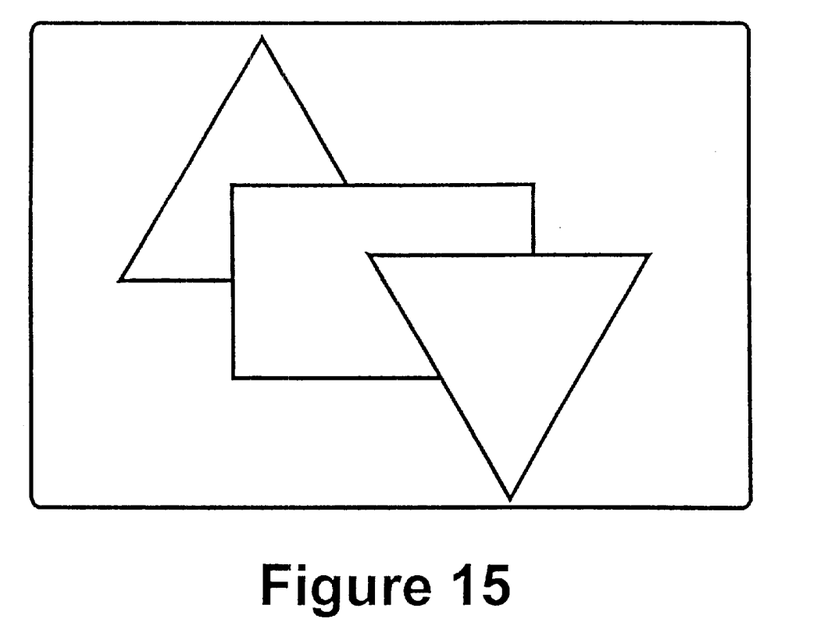
FIG. 15 is a diagram showing a composed image obtained by composing the image layers 2 to 0 shown in FIG. 12 to FIG. 14.

For example, by composing the image layers 2 to 0 shown in FIG. 12 to FIG. 14 in such a manner that the image layers 0 is the lowest with the layers 1 and 2 superposed successively upper (when the opaque portions of the image layers 0 and 1 overlap, the opaque portion of the image layer 1 is displayed while, when the opaque portions of the image layers 1 and 2 overlap, the opaque portion of the image layer 2 is displayed), the image layer shown in FIG. 15 is generated.

Figure 16:
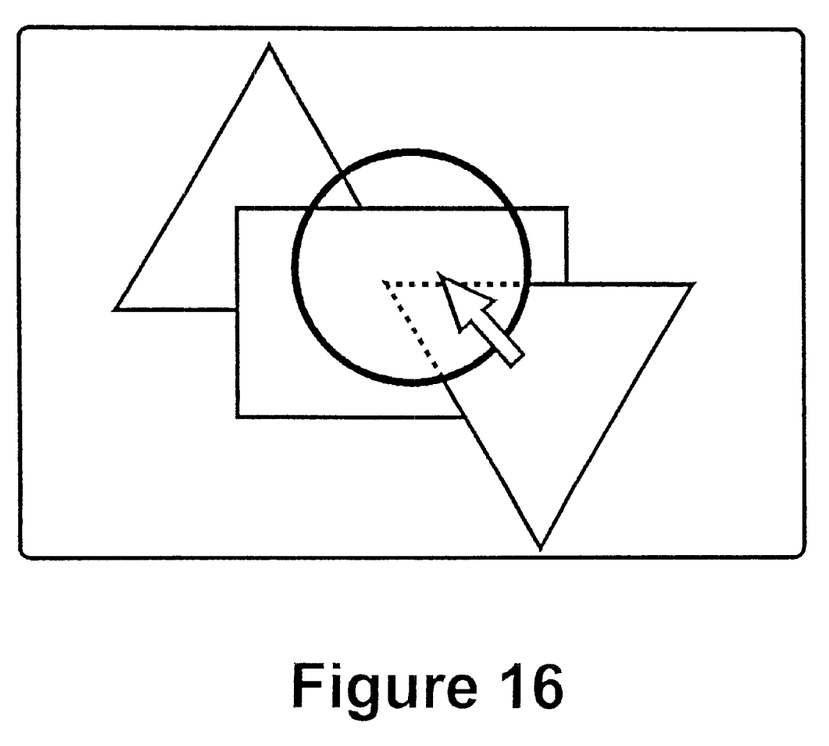
FIG. 16 is a diagram showing an image in which the image layer 1 is designated and the periphery of the pointer image is displayed through transparent layers.

If the user selects the transparent mode and moves the pointer image to the composed image with the image layer 1 designated, the image generating part 26 converts the periphery of the pointer of only the image layer 2 to a transparent state by the process shown in S200 (FIG. 6, FIG. 11) as shown in FIG. 16 while the image composing part 28 superposes the images of the image layers 0 and 1 which are not converted to a transparent state and the image of the image layer 2 which is converted to a transparent state for composing them to generate an image showing the manner of superposition among the image layers and display it in the display device 16 for presentation to the user.

FIG. 6 is referred to again.

In step 112 (S112), the image generating part 26 effects a retouch process to correct and modify the image layers and the positional relationship among the image layers based on the operation information from the operation receiving part 20 indicating correction and modification of the image layers and the positional relationship among the image layers by the user.

In step 114 (S114), the image generating part 26 determines whether or not the operation information from the operation receiving part 20 indicates the end of retouch work and ends processing if it indicates the end of the retouch work while it proceeds to the process of S102 otherwise.

As described in the above, in the frame image mode of the image processing apparatus 1 of this invention, the retouch work is easy because a rectangle indicating the positional relationship among the image layers is displayed at a position corresponding to the pointer image and the user can recognize the positional relationship of the image layers without moving the eyes.

In the transparent mode of the image processing apparatus 1 of this invention, the image layers can be aligned precisely because the user can recognize the manner of superposition of the image layers superposed around the pointer of the composed image and can accurately see the manner of superposition of the image layers in a fine portion.

The configuration of the image processing apparatus 1 shown in this embodiment has been taken as an example and the components thereof may be changed to other components having the same function and performance.

The components of the retouch software 2 may be implemented either by a software or a hardware so long as the same function and performance are implemented.

As described in the above, the image processing apparatus and the method thereof of this invention allows the positional relationship among a plurality of image layers to be precisely recognized to enable the image layers to be superposed in an accurate alignment.

According to the image processing apparatus and the method thereof, a desired portion of the composed image can be displayed through transparent layers to allow the positional relationship of a plurality of image layers superposed in this portion to be easily confirmed.

According to the image processing apparatus and the method thereof, the manner of superposition of the composed image can be displayed in the GUI window in the image editing work to improve the operability of the editing work.

According to the image processing apparatus and the method thereof, the editing work can be conveniently done by displaying an image indicating the manner of superposition of the image layers in the proximity of the pointer which is displayed on the screen in correlation to the pointer in an image editing work.

While the invention has been particularly shown and described with respect to preferred embodiments thereof, it will be understood by those skilled in the art that the foregoing and other changes in form and details may be made therein without departing form the spirit and scope of the invention.

Having thus described my invention, what I claim as new, and desire to secure by Letters Patent is:

1. An image composition processing apparatus for improving recognition and thereby adjustment of a positional relationship between a plurality of image layers, the image composition processing apparatus comprising:

pointer image displaying means for displaying an image of a pointer indicating an arbitrary position on a screen of an image display device in response to an input operation;

image composing/displaying means for superposing the plurality of image layers in superposition to compose them with the positional relationship among the image layers being maintained and displaying a resulting composed image on the screen;

positional relationship adjusting means for adjusting and shifting the positional relationship of a selected image layer among the plurality of image layers in response to said input operation to the display in the screen;

positional relationship displaying means for displaying an adjusted positional relationship among the plurality of image layers on the screen in proximity to the position of the pointer image on the screen, wherein the positional relationship image improves recognition of the positional relationship between the plurality of image layers;

said positional relationship displaying means makes a transparent area of one or more of the image layers corresponding to the position of the image of the pointer on the composed image transparent; and said image composing/displaying means superposes the image layer in which the transparent area is made transparent and an image layer other than the image layer in which the transparent area is made transparent for composing them to generate the composed image for display and displays the superposed image layers as the positional relationship image in the transparent area of the composed image.

2. The image composition processing apparatus of claim 1 in which said positional relationship displaying means receives a designation of more than one of said image layers and superposes frame images displaying frames of each of said designated image layers to compose them with the positional relationship of said designated image layers being maintained to display a composed image as said positional relationship image in proximity to the position of said pointer image.

3. The image composition processing apparatus of claim 1 further comprising:

layer information image displaying means for displaying a plurality of image layer windows, one image layer window for each of said plurality of image layers, said positional relationship displaying means, when it receives a designation of more than one of said image layers and said pointer image is in any of said image layers of said plurality of image layers, composes said designated image layers and frame images displaying a frame of predetermined one or more of said image layers with the positional relationship being maintained, and displays a composed image as said positional relationship image in proximity to the position of said pointer image.

4. The image composition processing apparatus of claim 1 in which said positional relationship displaying means makes an area of one or more of said image layers transparent in proximity to the position of said pointer image on said composed image, said image composing/displaying means superposes the image layer in which said transparent area is made transparent and an image layer other than said image layer in which said transparent area is made transparent for composing them to generate said composed image for display and displays said superposed image layers as said positional relationship image in the transparent area of said composed image.

5. The image composition processing apparatus of claim 4 in which said image composing/displaying means composes said plurality of image layers so as to make image layers superposed on top visible, and said positional relationship displaying means receives a designation of one of said plurality of image layers to make the image layer transparent which is superposed above said designated image layer.

6. An image composition processing method for improving recognition and thereby adjustment of a positional relationship between a plurality of image layers, the image composition processing method comprising the steps of:

displaying an image of a pointer indicating an arbitrary position on a screen of an image display device in response to an input operation;

superposing a plurality of image layers to compose them with the positional relationship among the image layers being maintained and displaying a resulting composed image on the screen;

adjusting and shifting the positional relationship of a selected image layer among the plurality of image layers in response to the input operation to the display on the screen;

making a transparent area of one or more of the image layers corresponding to the position of the image of the pointer on the composed image transparent;

superposing the image layer in which the transparent area is made transparent and an image layer other than the image layer in which the transparent area is made transparent for composing them to generate the composed image for display; and displaying the superposed image layers as a positional relationship image in the transparent area of the composed image.

7. A program storage device readable by machine, tangibly embodying a program of instructions executable by the machine to perform method steps for improving recognition and thereby adjustment of a positional relationship between a plurality of image layers in image composition processing, the method steps comprising:

displaying an image of a pointer indicating an arbitrary position on a screen of an image display device in response to an input operation;

superposing a plurality of image layers to compose them with the positional relationship among the image layers being maintained and displaying a resulting composed image on said screen;

adjusting and shifting the positional relationship of a selected image layer among the plurality of image layers in response to said input operation to the display on the screen;

making a transparent area of one or more of the image layers corresponding to the position of the image of the pointer on the composed image transparent;

superposing the image layer in which the transparent area is made transparent and an image layer other than the image layer in which the transparent area is made transparent for composing them to generate the composed image for display; and displaying the superposed image layers as a positional relationship image in the transparent area of the composed image.

8. The program storage device readable by machine as claimed in claim 7, further executing a method step for receiving a designation of more than one of said image layers and superposing frame images displaying frames of each of said designated image layers to compose them with the positional relationship of said designated image layers being maintained to display a composed image as said positional relationship image in proximity to the position of said pointer image in said image displaying step.

9. The program storage device readable by machine as claimed in claim 7, further executing method steps for, displaying a plurality of image layer windows, one image layer window for each of said plurality of image layers; and composing said designated image layers and frame images displaying the frame of predetermined one or more of said image layers with the positional relationship being maintained when a designation of more than one of said image layers is received and said pointer image is in any of said image layers of said plurality of image layers, and displaying a composed image as said positional relationship image in proximity to the position of said pointer image in said image displaying step.

10. The program storage device readable by machine as claimed in claim 7, further executing method steps for, making an area of one or more of said image layers corresponding to the position of said pointer image on said composed image transparent in said image displaying step;

superposing the image layer in which said transparent area is made transparent and an image layer other than said image layer in which said transparent area is made transparent for composing them to generate said composed image for display in said image superposing step, and displaying said superposed image layers as said positional relationship image in the transparent area of said composed image.

11. The program storage device readable by machine as claimed in claim 10, further executing method steps for, composing said plurality of image layers so as to make image layers superposed on top of said plurality of image layers visible in said image superposing step; and receiving a designation of one of said plurality of image layers to make the image layer transparent which is superposed above said designated image layer in said image displaying step.

* * * * *